United States Patent
Jewell et al.

(10) Patent No.: US 6,542,672 B2
(45) Date of Patent: *Apr. 1, 2003

(54) OPTO-MECHANICAL ASSEMBLY

(75) Inventors: Jack L. Jewell, Boulder, CO (US); Stanley Swirhun, Boulder, CO (US); Mikhail Kaluzhny, Boulder, CO (US); Andrew Moore, Broomfield, CO (US)

(73) Assignee: Picolight, Incorporated, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/092,470

(22) Filed: Mar. 8, 2002

(65) Prior Publication Data

US 2002/0102060 A1 Aug. 1, 2002

Related U.S. Application Data

(62) Division of application No. 09/822,207, filed on Apr. 2, 2001, now Pat. No. 6,421,474, which is a division of application No. 09/323,204, filed on Jun. 1, 1999, now Pat. No. 6,243,508.

(51) Int. Cl.[7] .................................................. G02B 6/30
(52) U.S. Cl. .............................. 385/49; 385/33; 385/93
(58) Field of Search ........................ 385/33, 35, 88–94, 385/147

(56) References Cited

U.S. PATENT DOCUMENTS

| | | |
|---|---|---|
| 4,168,883 A | 9/1979 | MacLeod |
| 4,204,743 A | 5/1980 | Etaix |
| 4,265,511 A | 5/1981 | Nicia et al. |
| 4,307,934 A | 12/1981 | Palmer |
| 4,355,321 A | 10/1982 | Yeats |
| 4,451,115 A | 5/1984 | Nicia et al. |
| 4,501,637 A | 2/1985 | Mitchell et al. |
| 4,616,899 A | 10/1986 | Schlafer |
| 4,639,077 A | 1/1987 | Dobler |
| 4,687,285 A | 8/1987 | Hily et al. |
| 4,698,662 A | 10/1987 | Young et al. |
| 4,707,067 A | 11/1987 | Haberland et al. |
| 4,711,521 A | 12/1987 | Thillays |
| 4,733,932 A | 3/1988 | Frenkel et al. |
| 4,740,259 A | 4/1988 | Heinen |
| 4,752,109 A | 6/1988 | Gordon et al. |
| 4,753,508 A | 6/1988 | Meuleman |
| 4,758,719 A | 7/1988 | Sasaki et al. |
| 4,790,618 A | 12/1988 | Abe |
| 4,818,053 A | 4/1989 | Gordon et al. |
| 4,824,202 A | 4/1989 | Auras |
| 4,842,391 A | 6/1989 | Kim et al. ..................... 385/88 |
| 4,862,231 A | 8/1989 | Abend .......................... 357/19 |
| 5,046,798 A | 9/1991 | Yagiu et al. ................... 350/34 |
| 5,050,953 A | 9/1991 | Anderson et al. ............. 385/89 |
| 5,073,047 A | 12/1991 | Suzuki et al. ................. 385/93 |
| 5,074,682 A | 12/1991 | Uno et al. ..................... 385/93 |
| 5,075,253 A | 12/1991 | Sliwa, Jr. .................... 437/209 |
| 5,175,783 A | 12/1992 | Tatoh ........................... 385/93 |
| 5,181,265 A | 1/1993 | Nishiwaki et al. ............ 385/33 |
| 5,214,845 A | 6/1993 | King et al. .................... 29/841 |
| 5,239,605 A | 8/1993 | Shimada ....................... 385/88 |
| 5,244,818 A | 9/1993 | Jokerst et al. ................. 437/3 |
| 5,247,530 A | 9/1993 | Shigeno et al. ............... 372/36 |

(List continued on next page.)

Primary Examiner—Phan T. H. Palmer
(74) Attorney, Agent, or Firm—Jagtiani + Guttag

(57) ABSTRACT

A novel electro-opto-mechanical assembly is provided. The electro-opto-mechanical assembly comprising: a first wafer, the wafer having a top and bottom surface; at least one optical element disposed on one surface of the first wafer; at least one discrete opto-electronic transducer element disposed on the bottom surface of the first wafer and in optical communication with the optical element; and an optical waveguide; wherein the first wafer and the optical element form an optical relay which relays light between the discrete opto-electronic transducer and the optical waveguide and thereby forms an efficient optical coupling between the discrete opto-electronic transducer and the optical waveguide.

4 Claims, 8 Drawing Sheets

U.S. PATENT DOCUMENTS

| | | | |
|---|---|---|---|
| 5,257,336 A | 10/1993 | Dautartas | 385/93 |
| 5,283,447 A | 2/1994 | Olbright et al. | 257/85 |
| 5,287,001 A | 2/1994 | Buchmann et al. | 257/719 |
| 5,291,064 A | 3/1994 | Kurokawa | 257/714 |
| 5,337,398 A | 8/1994 | Benzoni et al. | 385/90 |
| 5,347,813 A | 9/1994 | Isaksson | 385/92 |
| RE34,790 E | 11/1994 | Musk | 385/93 |
| 5,362,976 A | 11/1994 | Suzuki | |
| 5,416,869 A | 5/1995 | Yoshino | 385/88 |
| 5,440,658 A | 8/1995 | Savage, Jr. | 385/79 |
| 5,452,389 A | 9/1995 | Tonai et al. | 385/92 |
| 5,457,759 A | 10/1995 | Kalonji et al. | 385/31 |
| 5,463,707 A | 10/1995 | Nakata et al. | 385/35 |
| 5,485,021 A | 1/1996 | Abe | |
| 5,495,545 A | 2/1996 | Cina et al. | 385/92 |
| 5,500,540 A | 3/1996 | Jewell et al. | 257/82 |
| 5,504,828 A | 4/1996 | Cina et al. | 385/33 |
| 5,521,999 A | 5/1996 | Chuang et al. | 385/88 |
| 5,526,455 A | 6/1996 | Akita et al. | 385/93 |
| 5,537,504 A | 7/1996 | Cina et al. | 385/93 |
| 5,546,212 A | 8/1996 | Kunikane et al. | 359/163 |
| 5,546,490 A | 8/1996 | Kikuchi et al. | 385/93 |
| 5,548,676 A | 8/1996 | Savage, Jr. | 385/92 |
| 5,555,334 A | 9/1996 | Ohnishi et al. | 385/93 |
| 5,566,264 A | 10/1996 | Kuke et al. | 385/49 |
| 5,566,265 A | 10/1996 | Spaeth et al. | 385/93 |
| 5,600,741 A | 2/1997 | Hauer et al. | 385/35 |
| 5,631,992 A | 5/1997 | Takahashi et al. | 385/94 |
| 5,692,083 A | 11/1997 | Bennett | 385/88 |
| 5,734,771 A | 3/1998 | Huang | 385/93 |
| 5,737,133 A | 4/1998 | Ouchi et al. | 359/819 |
| 5,737,465 A | 4/1998 | Okochi | 385/88 |
| 5,745,625 A | 4/1998 | Aikiyo et al. | 385/94 |
| 5,771,218 A | 6/1998 | Feldman et al. | 369/112 |
| 5,940,564 A | 8/1999 | Jewell | 385/93 |
| 6,243,508 B1 | 6/2001 | Jewell et al. | 385/14 |

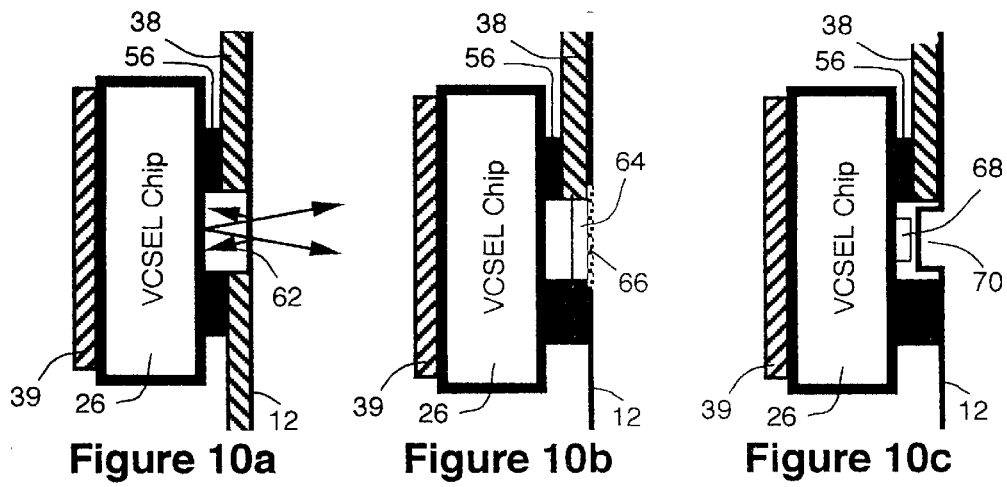
Figure 10a  Figure 10b  Figure 10c
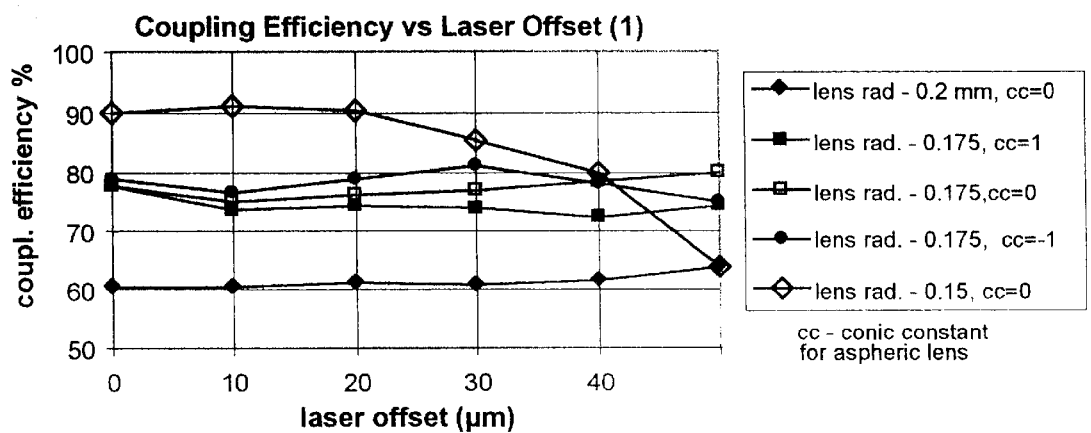
Figure 11
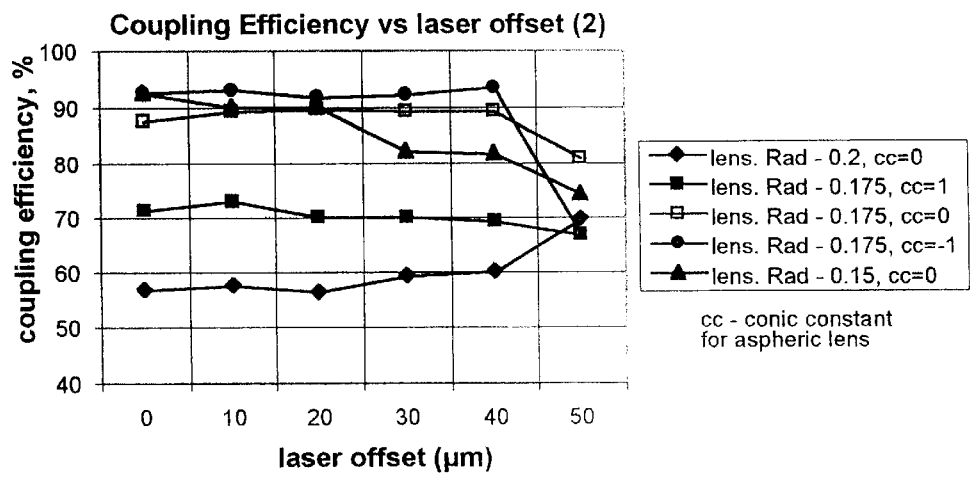
Figure 12

OPTO-MECHANICAL ASSEMBLY

CROSS-REFERENCE TO RELATED APPLICATIONS

This application makes reference to the following U.S. patent application: U.S. application Ser. No. 08/905,938, entitled "Device for Coupling a Light Source or Receiver to an Optical Waveguide," filed Aug. 5, 1997 now U.S. Pat. No. 5,940,564. This application is hereby incorporated by reference.

This invention is made with government support under contract number FC 49620-97-C-0039, awarded by the Ballistic Missile Defense Organization. The government may have certain rights in this invention.

BACKGROUND OF THE INVENTION

1. Field of the Invention

The present invention relates generally to connectors, and more particularly to a connector for passively aligning a light source or detector to an optical waveguide such as a fiber optic cable or bundle.

2. Description of the Prior Art

Communication systems are now being developed in which optical waveguides such as optical fibers are used as conductors for modulated light waves to transmit information. These fibers may be utilized for long distance communication networks, fiber to the home networks, wide area networks, or local area networks.

The communication networks used comprise at least a connector between the optical waveguide and a detector or light emitter. A detector converts the signal from the light waves to an electrical signal which may be used by conventional electrical devices such as a computer. A light emitter, on the other hand, performs the opposite function. It converts an electrical signal into an optical signal. A generic term of either a light emitter or a detector is an "optoelectronic transducer."

This application addresses the means and efficiency of optical coupling between an optical waveguide and an optoelectronic transducer. For single mode fibers, high efficiency coupling into the waveguide requires: 1) close matching of the sizes of the light beam and the waveguide; 2) close matching of the angular extent of the light beam with the acceptance angle of the waveguide; and 3) close positional alignment between the light beam and the waveguide. Furthermore, real world effects, such as temperature changes, may change the alignment. For this reason, many commercial couplers compromise efficiency for slight positional tolerances. For example, the light beam may be focused to a spot smaller than the waveguide with the inevitable result that some light will be lost in the waveguide. For multimode fibers, these alignment considerations may be relaxed considerably.

The prior art has also addressed the alignment problem by actively aligning the above elements. The major disadvantage of active alignment is the cost associated with this process. For example, for a device to be actively aligned, the light source needs to be turned on and the other elements must be aligned with the light source while the device is activated. By using this approach, one must carefully align each device produced. Obviously, this is not preferable if one is to mass-produce these elements.

Numerous patents teach active alignment as discussed above. For example, U.S. Pat. No. 4,204,743, by Etaix, discloses an actively aligned connector for coupling an optical fiber to a light emitter or receiver. This reference teaches the use of a truncated cone in order to facilitate contacting of the emitter or receiver without being obstructed by electrical connections to the emitter or receiver. This device is activated to align the emitter with the optics. Additionally, this device is very intolerant to off-axis alignment of the optical lenses.

U.S. Pat. No. 4,307,934, by Palmer, discloses a packaged fiber optic module that utilizes two oppositely oriented convex lenses to transmit light between a light source and a fiber bundle. Because of the use of this particular construction, the distance between the fiber bundle and its associated convex lens is critical since the lens functions to focus the light beam generated by the light source. Thus, it is essential that active alignment be utilized in this device. Additionally, this device is very intolerant to off-axis alignment of the optical lenses.

U.S. Pat. No. 4,687,285, by Hily et al, discloses a packaged fiber optic module that utilizes two oppositely oriented plano-convex lenses in combination with a ball lens to transmit light between a light source and a fiber bundle. As may be seen, the axis of each lens must be in perfect alignment for this system to function properly. Therefore, this device is very intolerant to off-axis alignment of the optical lenses. This reference also teaches the use of an adhesive to allow the ball lens to be manipulated during the active alignment process.

U.S. Pat. No. 4,687,285, by Haberland et al, discloses a packaged fiber optic module that has an active alignment positioning means. In addition, this reference teaches the use of a single spherical or cylindrical lens for focusing a light beam from a fiber optic cable onto a detector. As may be seen in FIG. 8, it is critical to align this spherical lens to the cable in order to achieve coupling between the cable and the detector. Thus, this device is very intolerant to off-axis alignment of the optical lenses.

U.S. Pat. No. 4,711,521, by Thilays, discloses a terminal device for an optical fiber. A mechanical guiding operation, by means of a pin, is used to actively position a ball lens with respect to a fiber optic cable end. The ball lens utilized by this reference must be the same order of magnitude as the exit aperture, e.g, 80 to 100 microns for the ball lens and 200 microns for the aperture. This is an essential to allow precision alignment. Therefore, this device is very intolerant to off-axis alignment of the optical lens with the aperture.

U.S. Pat. No. 4,753,508, by Meuleman, discloses an optical coupling device that utilizes a reflective cavity to provide optical coupling between a fiber cable and a light emitter. A spherical lens is aligned with the optical axis of the fiber cable and is disposed outside of the reflective cavity. Precision active alignment of the spherical lens to the fiber cable is essential for the operation of this device. Therefore, this device is very intolerant to off-axis alignment of the optical lens.

U.S. Pat. No. 5,347,605, by Isaksson, discloses an optoelectronic connector that is actively aligned. To perform this alignment, a mirror is provided which is journaled and is adjusted to provide maximum coupling efficiency while the light source is active.

U.S. Pat. Nos. 5,537,504, and 5,504,828, both by Cina et al., disclose a transducer, a spherical lens and an optical fiber cable in axial alignment with one another. This is accomplished by activating the transducer and aligning the spherical lens with respect to the fiber cable. Once this is done, the position of the laser and lens is fixed by heating an epoxy layer. In addition, the spherical lens is provided with different surfaces, one for collimating light and one for introducing a spherical aberration that compensates for lens position. Precision active alignment of the spherical lens to the fiber cable is essential for the operation of this device. Therefore, this device is very intolerant to off-axis alignment of the optical lens, even with the second surface of the spherical lens.

U.S. Pat. No. 4,842,391, by Kim et al., discloses an optical coupler that utilizes two spherical lenses between a laser diode and a fiber cable. As may be seen, active alignment is provided by a set of screws which is used to actively align the optical elements to increase coupling efficiency.

U.S. Pat. Nos. 4,265,511 and 4,451,115, both issued to Nicia et al. disclose the use of two ball lenses for coupling optical fibers. In a similar fashion, U.S. Pat. No. 5,175,783, by Tatoh, discloses a similar structure. These patents disclose the concept of carefully aligning each fiber in a tube to a precise axial and distance position with respect to its respective ball lens. Therefore, these devices are very intolerant to off-axis alignment of the optical lens.

Other patents which disclose active alignment of a lens to a fiber cable include: U.S. Pat. No. 5,526,455, by Akita et al.; U.S. Pat. No. Re 34,790, by Musk; U.S. Pat. No. 5,073,047, by Suzuki et al.; U.S. Pat. No. 4,824,202, by Auras; U.S. Pat. No. 4,818,053, by Gordon et al.; U.S. Pat. No. 4,790,618, by Abe; U.S. Pat. No. 5,452,389, by Tonai et al.; and U.S. Pat. No. 4,752,109, by Gordon et al. Precision active alignment of the lens to the fiber cable is essential for the operation of these devices. Therefore, these devices are very intolerant to off-axis alignment of the optical lens to the light source.

The prior art has addressed this issue of off-axis alignment of the fiber cable and the light source. For example, U.S. Pat. No. 5,566,265, by Spaeth et al., discloses a module for bi-directional optical signal transmission. In this device, a plano-convex lens is aligned with the optical axis of a fiber cable and a beam splitter is aligned with a edge emitting light source. By adjusting the beam splitter in relation to the plano-convex lens, one may correct for off axis alignment of the light source and the fiber cable. In a similar fashion, U.S. Pat. No. 5,463,707, by Nakata et al., discloses the use of a barrel lens instead of a plano-convex lens. U.S. Pat. No. 5,546,212, by Kunikane et al., discloses the use of a prism instead of a beam splitter. U.S. Pat. No. 5,074,682, by Uno et al., discloses the use of a Grin rod lens instead of a beam splitter.

The prior art also addresses the issue of utilizing conventional TO Cans in opto-mechanical assemblies. These patents generally address the use of a laser diode in a TO Can which is aligned to a mechanical structure which partially houses the Can. Examples of U.S. Patents which discuss these structures include: U.S. Pat. No. 5,239,605 by Shinada; U.S. Pat. No. 5,274,723 by Komatsu; U.S. Pat. No. 5,526,455 by Akita et al.; U.S. Pat. No. 4,639,077 by Dobler; U.S. Pat. No. 5,046,798 by Yagiu et al.; U.S. Pat. No. 5,495,545 by Cina et al.; U.S. Pat. No. 5,692,083 by Bennett; U.S. Pat. No. 5,440,658 by Savage; and U.S. Pat. No. 5,548,676 by Savage. None of these references provide any teaching as to how to integrate the opto-electronic transducer into the package and provide wafer scale assembly of the package.

Finally, the prior art has addressed micro-mechanical structures utilized in an opto-mechanical package. These patents generally address the use of a semiconductor or ceramic material base for an opto-electronic transducer. Examples of U.S. Patents which discuss these structures include: U.S. Pat. No. 4,733,932 by Frenkel et al.; U.S. Pat. No. 5,362,976 by Suzuki; U.S. Pat. No. 5,485,021 by Abe; U.S. Pat. No. 5,566,264 by Kuke et al.; U.S. Pat. No. 5,734,771 by Huang; and U.S. Pat. No. 5,500,540 by Jewell et al. and U.S. Pat. No. 5,266,794 by Olbright et al.

SUMMARY OF THE INVENTION

It is therefore an object of the present invention to provide an opto-mechanical assembly that may be manufactured on a semi-wafer scale.

It is a further object of the present invention to provide an opto-mechanical assembly that provides easy optical coupling between a light source/detector and a fiber.

It is a further object to provide an opto-mechanical assembly where the waveguide insertional losses are low.

It is yet another object to provide an opto-mechanical assembly which may meet very stringent specifications for use in special environments, for example, under water or in gases of composition which may damage a light source.

It is yet another object to provide for significantly reduced optical aberrations generated by the opto-mechanical assembly.

It is yet another object to provide an opto-mechanical assembly that has the ability to withstand moderate temperature cycles of approximately 200° C.

In all of the above embodiments, it is an object to provide an opto-mechanical assembly that has a small number of components and high endurance against a connecting/disconnecting operation and which can be aligned easily.

In all of the above embodiments, it is a further object to provide an opto-mechanical assembly that has the ability to tolerate lateral and angular misalignment of the light source/detector and fiber.

According to one broad aspect of the present invention, there is provided an electro-opto-mechanical assembly comprising: a first wafer, the wafer having a top and bottom surface; at least one optical element disposed on the top surface of the first wafer; at least one discrete opto-electronic transducer element disposed in communication with the bottom surface of the first wafer and in optical communication with the optical element; and an optical waveguide; wherein the first wafer and the optical element form an optical relay which relays light between the discrete opto-electronic transducer and the optical waveguide and thereby forms an efficient optical coupling between the discrete opto-electronic transducer and the optical waveguide.

According to another broad aspect of the present invention, there is provided an electro-opto-mechanical assembly comprising: a first wafer, the wafer having a top and bottom surface; an optical waveguide proximal to the top surface of the first wafer; a second wafer having a top and bottom surface, the second wafer being disposed between the first wafer and the waveguide and the bottom of the second wafer being proximal to the top of the first wafer; at least one optical element disposed on the bottom surface of the second wafer; and at least one discrete opto-electronic transducer element disposed in communication with the bottom surface of the first wafer and in optical communication with the optical element; wherein the first wafer, the second wafer and the optical element form an optical relay which relays light between the discrete opto-electronic transducer and the optical waveguide and thereby forms an efficient optical coupling between the discrete opto-electronic transducer and the optical waveguide.

According to yet another broad aspect of the present invention, there is provided an electro-opto-mechanical assembly comprising: a first wafer, the wafer having a top and bottom surface; at least one optical element disposed on the bottom surface of the first wafer; at least one discrete opto-electronic transducer element disposed in communication with the bottom surface of the first wafer and in optical communication with the optical element; and an optical waveguide; wherein the first wafer and the optical element form an optical relay which relays light between the discrete opto-electronic transducer and the optical waveguide and thereby forms an efficient optical coupling between the discrete opto-electronic transducer and the optical waveguide.

According to yet another broad aspect of the present invention, there is provided an electro-opto-mechanical assembly comprising: a first wafer, the wafer having a top and bottom surface; at least first and second optical elements disposed on the top surface of the first wafer; at least first and second discrete opto-electronic transducer elements disposed on the bottom surface of the first wafer and in optical communication with respective the first and second optical elements; and at least first and second optical waveguides; wherein the first wafer and the first optical element form an optical relay which relays light between the first discrete opto-electronic transducer and the first optical waveguide and thereby forms an efficient optical coupling between the first discrete opto-electronic transducer and the first optical waveguide; and wherein the first wafer and the second optical element form an optical relay which relays light between the second discrete opto-electronic transducer and the second optical waveguide and thereby forms an efficient optical coupling between the second discrete opto-electronic transducer and the second optical waveguide.

According to yet another broad aspect of the present invention, there is provided an electro-opto-mechanical assembly comprising: a first wafer, the wafer having a top and bottom surface; at least first and second optical elements disposed on the top surface of the first wafer; at least first and second discrete opto-electronic transducer elements disposed on the bottom surface of the first wafer and in optical communication with respective the optical elements; at least first and second optical waveguides; and means for reducing crosstalk between at least two of the discrete opto-electronic transducer elements from the first wafer; wherein the first wafer and the first optical element form an optical relay which relays light between the first discrete opto-electronic transducer and the first optical waveguide and thereby forms an efficient optical coupling between the first discrete opto-electronic transducer and the first optical waveguide; and wherein the first wafer and the second optical element form an optical relay which relays light between the second discrete opto-electronic transducer and the second optical waveguide and thereby forms an efficient optical coupling between the second discrete opto-electronic transducer and the second optical waveguide.

Other objects and features of the present invention will be apparent from the following detailed description of the preferred embodiment.

BRIEF DESCRIPTION OF THE DRAWINGS

The invention will be described in conjunction with the accompanying drawings, in which:

FIG. 2b is a back view of lead frame connectors associated with the patterned electrical connections of FIG. 2a;

FIGS. 10a, 10b and 10c are cross-sectional views of the mounting structure for attaching a VCSEL to the lens of FIGS. 1, 5 through 9, 13, and 16 through 19;

FIGS. 11 and 12 are plots of laser offset v. coupling efficiency for select lenses;

DETAILED DESCRIPTION OF THE PREFERRED EMBODIMENT

Before describing the invention, it is essential to provide definitions to terms that are used in the description of the invention. The first of these terms is an optical waveguide.

For the purposes of this patent application, an "optical waveguide" is a system of material boundaries or structures for guiding an optical wave. Such waveguides include, but are not limited to, single mode optical fibers, multi-mode optical fibers, semiconductor waveguides, dielectric waveguides, single mode polymer waveguides, and multi-mode polymer waveguides and optical connectors.

A single mode optical fiber (SMF) is a fiber optic cable in which only the lowest order bound mode (which may consist of a pair of orthogonal polarized fields) may propagate at the wavelength of interest. Generally, SMF has a waveguide in core diameter of ~8 $\mu$m for wavelengths in the 1300 to 1600 nm range. It should be appreciated that the diameter of the SMF may vary while still utilizing the teachings of the present invention.

A multi-mode optical fiber (MMF) is a fiber optic cable that will allow more than one bound mode to propagate. Typically, MMF has a waveguide in core diameter of ~50 $\mu$m or more. Several types of MMF are of particular interest to this invention. One type of fiber is plastic fiber having a core diameter of 100 $\mu$m, 125 $\mu$m or 250 $\mu$m. Another type of fiber is a 50 $\mu$m or 62.5 $\mu$m diameter glass fiber.

It should be understood that while specific fibers have been discussed above, the inventive concept may be applied to any SMF, MMF, or any waveguide including all discussed above. It should be appreciated that a particular design technique used for a MMF may not function for a SMF due to the tolerance differences between the fibers. A design technique for a SMF will usually function in an MMF environment, but may be more costly than techniques designed for an MMF.

Figure 14:
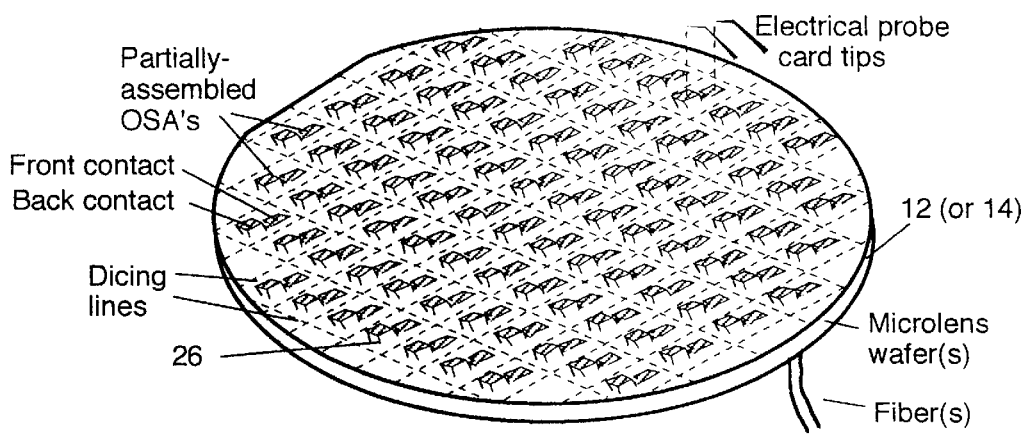
FIG. 14 is an isometric view of a microlens wafer having a plurality of opto-mechanical assemblies as illustrated in FIGS. 1, 5 through 9 and 13.

For the purpose of this application, a wafer is defined as a material having substantially parallel and planar surfaces. An optical wafer is a wafer that has at least a region which is composed of a substantially optically transparent material which for the purposes of this application means any material which allows at least 10% transmission of light at a wavelength of interest. It should be appreciated that the term "wafer" may represent a whole wafer as illustrated in FIG. 14 or any portion thereof such as in FIG. 1. The term "semi-wafer" refers to the use of an optical wafer and discrete optoelectronic transducer elements affixed together.

For the purpose of this application, an "optoelectronic transducer" is a generic term for an optoelectronic device which either converts electrical energy to optical energy, or optical energy to electrical energy, or both.

Figure 1:
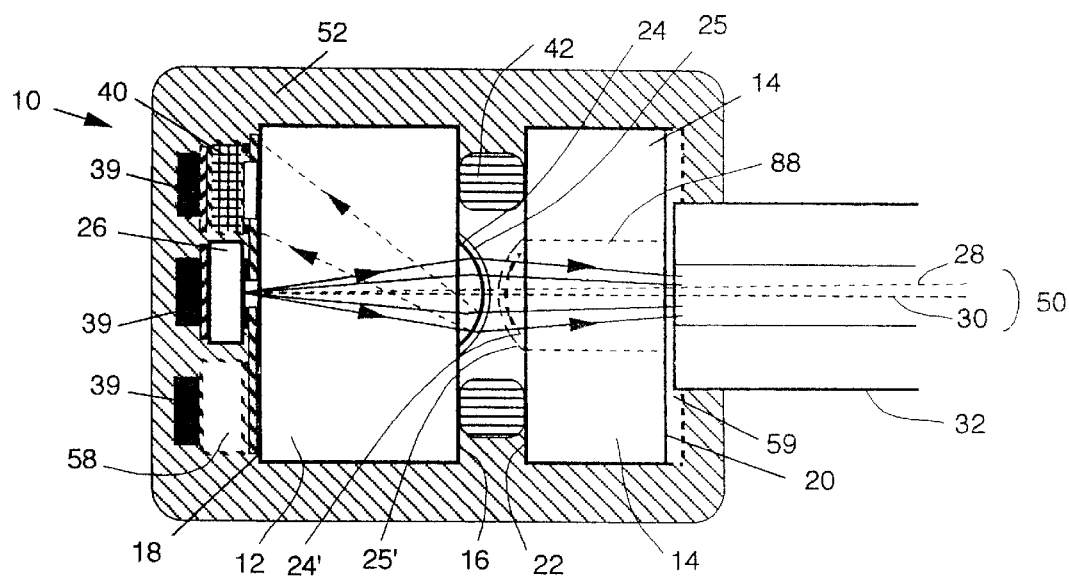
FIG. 1 is a cross sectional view of an opto-mechanical assembly constricted in accordance with a preferred embodiment of the invention.

With reference to the Figures, wherein like references characters indicate like elements throughout the several views and, in particular, with reference to FIG. 1, an opto-mechanical assembly 10 is illustrated. In order to understand how the opto-mechanical transducer was formed and the novelty associated with this formation, one should refer to FIG. 15 which is a block diagram of the formation process for the opto-mechanical assembly of FIG. 1. In order to avoid confusion, we will first describe the case for the MMF embodiment since this embodiment has fewer restrictions than the SMF embodiment.

As may be seen from block 100, a first optical wafer substrate 12 is formed. This first wafer 12 may be formed by any means known in the art or may be commercially purchased from Schott or AXT. Optical wafer substrate 12 may be glass, plastic, sapphire, crystal, ceramic, semiconductor or any other material known in the wafer processing art. The preferred material is glass because of the optical characteristics, commercial availability, and the large variety of characteristics available, such as thermal expansion matching with other materials. The use of plastic is desired due to the ease of use in molding and low cost. In addition, the use of plastic allows for easier thermal matching between the wafer and the opto-mechanical assembly housing. The use of semiconductor material, such as, but not limited to GaP, GaAs, or Si, may be desired for improved heat dissipation, for thermal matching with an optoelectronic transducer, for fabricating electronic circuitry, or so that the entire fabrication process may be expedited by growing a light source directly on optical wafer 12. Additionally, sapphire may be the preferred material for wafer 12 because of its ruggedness and the possibility of forming silicon-on-sapphire (SOS) circuits.

Turning back to FIG. 15, the next step in the process is the production of optical elements 24 such as microlenses on optical wafer 12. For convenience, we have defined each optical wafer 12 as having a top and bottom planar surface 16, 18 respectively. In a preferred embodiment, optical elements 24, for example, refractive lenses, are formed on top planar surface 16. This may be accomplished by spinning photoresist on top surface 16 of optical wafer 12 and patterning pancakes of this photoresist. Finally, the photoresist pancakes are then melted to form optical elements 24 such as microlenses. Shapes of optical elements 24 are determined by varying the relationship between the diameter of the pancake and the thickness of the pancake as well as the viscosity of the photoresist. Refractive microlenses may be produced by other techniques such as replication by molding or by a gray-level photoresist process. It should be appreciated that holograms may be utilized.

Figure 7:
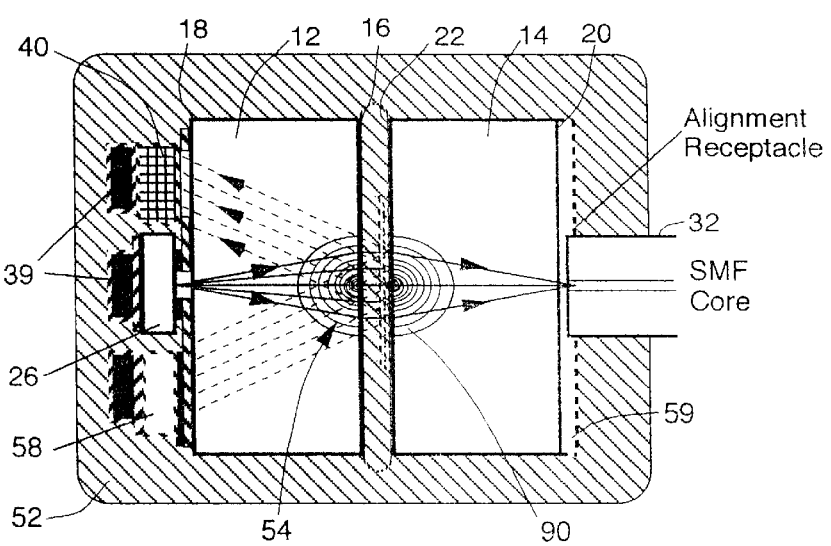
FIG. 7 is a cross-sectional view of an alternative embodiment of the opto-mechanical assembly of FIG. 1, which illustrates an ion-diffused planar microlens system used to couple a single mode waveguide to a light source.

In an alternative embodiment, one may pattern holes through a masking layer on top surface 16 of optical wafer 12 and diffuse ions in these holes. This changes the refractive index of wafer 16 in select regions 54 localized near the holes as illustrated in FIG. 7. This technique is effective in making a gradient index (GRIN) lens. Finally, diffractive and/or holographic lenses may also be constructed.

It should be appreciated that coatings 25 may be applied to optical elements 24 after their formation on optical wafer 12. The significant advantage to this approach is that the cost of manufacturing each individual optical element 24 is reduced since the process is performed on a wafer level. Optical elements 24 that may be formed by the processes discussed above and by other processes, include, but are not limited to: microlenses, reflectors (partial or total).

For MMF embodiment, it may be beneficial to introduce defocus in optical elements 24. It should be appreciated that the introduction of these optical distortions are generally not desired in the SMF embodiment. The benefit to utilizing these distortions in the MMF embodiment include, but are not limited to: reduced optical feedback into optoelectronic transducer 26 resulting from reflections from fiber 32, and reduced sensitivity to alignment variations.

The shape of optical element 24 may be optimized as may be seen in FIG. 11 and 12. For example, the conic constant cc=0 describes a spherical lens, cc=−1 is an asphere, cc=+1 is another asphere. As may be seen, for the cases simulated and illustrated, it is preferable to have a cc≦0.

Figure 5:
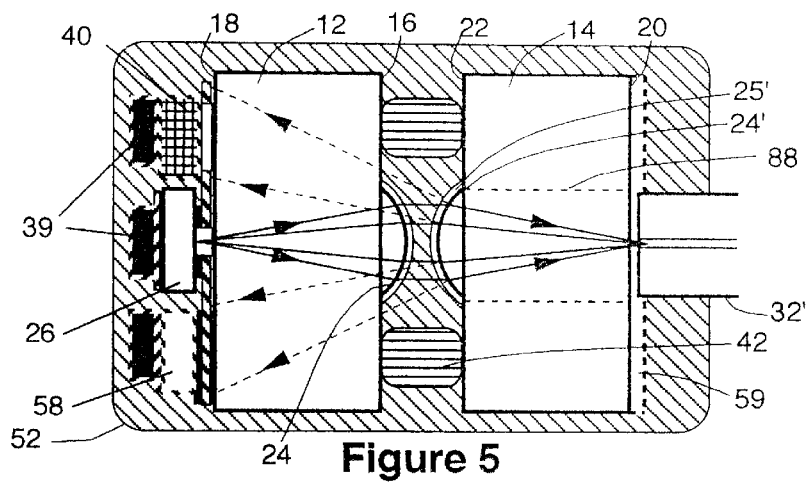
FIG. 5 is a cross-sectional view of an alternative embodiment of the opto-mechanical assembly of FIG. 1, which illustrates a refractive lens system used to couple a single mode waveguide to a light source.
Figure 6:
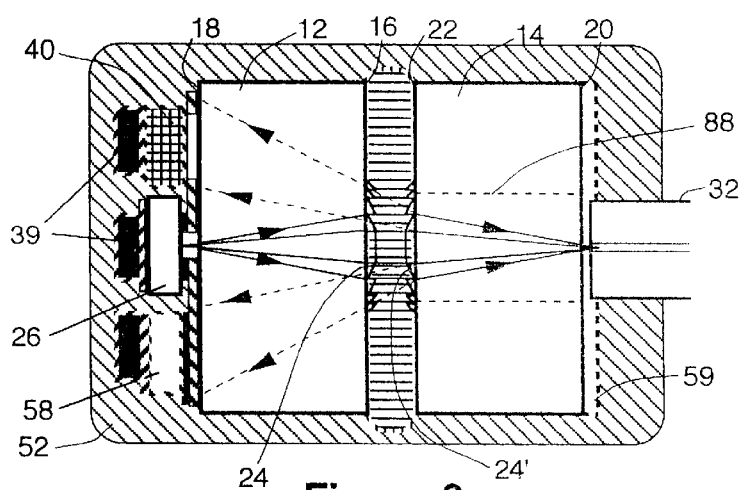
FIG. 6 is a cross-sectional view of an alternative embodiment of the opto-mechanical assembly of FIG. 1, which illustrates a diffractive lens system used to couple a single mode waveguide to a light source.

In a similar fashion, second wafer substrate 14 may be constructed. It should be appreciated that optical wafers 12 and 14 may be of different material or may be constructed from the same material. Optical wafer 14 has top and bottom surfaces 20, 22 respectively. In an alternate embodiment, optical wafer 14 would have optical elements 24' fabricated on bottom surface 22 while wafer 12 would not have optical elements 24. In this manner, the optical elements 24' may be further separated along an optical axis from optoelectronic transducer 26. Additionally, processing of optical wafer 12 may be conducted independently of optical wafer 14. In yet another embodiment, optical elements 24 and 24' will be present as illustrated in FIG. 5. It should be appreciated that having optical elements 24, 24' on both optical wafers 12 and 14 would preferably be associated with SMF applications as illustrated in FIGS. 5 and 6. Preferably, if optical wafer 12 is thick enough, e.g., FIGS. 1, 8, 9, and 13, optical elements 24 may be disposed on optical wafer 12 in a MMF application. An optical coating 25' may be placed on optical element 24', for example, to reduce or increase reflections from optical element 24. It should be appreciated that optical elements 24 and 24' may be the same type or different optical elements.

Turning back to FIG. 1, there are two optical axes illustrated. The first optical axis 28 is associated with optoelectronic transducer 26 and the second optical axis 30 is associated with waveguide 32. As may be seen in FIG. 1, axes 28 and 30 may be in lateral and/or angular misalignment. This is due to minor misalignments of elements of the opto-mechanical assembly 10. As may be seen, optical elements 24 or 24' may compensate for this minor misalignment to allow for efficient optical coupling between optoelectronic transducer 26 and waveguide 32.

An important feature of this invention is the ability to have efficient optical coupling between waveguide 32 and optoelectronic transducer 26, despite misalignment between optical axes 28 and 30. This feature is better illustrated in FIG. 4, which is discussed below.

Figure 2A:
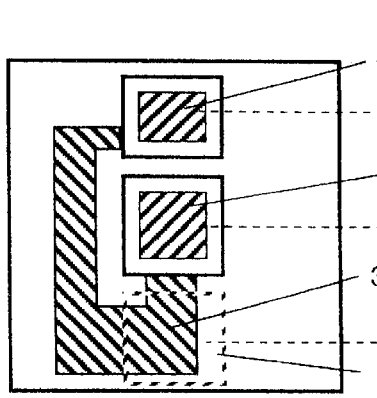
FIG. 2a is a back view of a wafer microlens chip showing patterned electrical connections for the opto-mechanical assembly of FIG. 1.
Figure 2B:
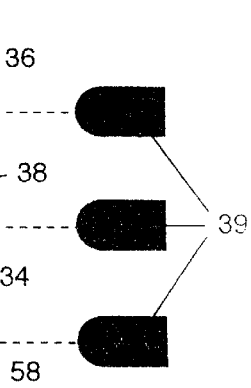
Figure 3:
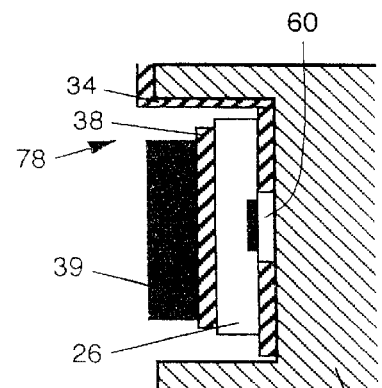
FIG. 3 is a cross sectional view of a laser mounting utilized in an alternate embodiment of the opto-mechanical assembly.

As discussed above, optical wafer 12 may be processed independently of optical wafer 14. As may be seen in FIG. 2a, electrical connections such as common contact 34 may be patterned on bottom surface 18 of optical wafer 12. This has the added advantage of providing electrical access to the side of optoelectronic transducer 26 which faces optical wafer 12 as illustrated in FIGS. 2a and 3. Photodiode contact 36 and optoelectronic transducer contacts 38 are also provided to complete electrical circuits to photodiode 40 and optoelectronic transducer 26, respectively.

Protective epoxy 42 is utilized to attach optical wafers 12,14 as well as provide a space around optical element(s) 24, 24' there between. For example, this may allow the device to have an air gap with a refractive index of 1.0, between optical wafers 12 and 14 which have a refractive index of 1.5 and 1.5 respectively. Optical elements 24 and 24' typically have a refractive index of 1.5. It should be appreciated that while an air gap is disclosed in the preferred embodiment, any material may be placed in this gap so long as there is a difference in refractive indices between the material utilized and optical element 24 or 24' of at least 0.2. Epoxy 42 may be applied by a silk screening process which has a tolerance of ~10 $\mu$m. In a preferred embodiment, optical wafers 12,14 are mounted together by epoxy 42 to form a unitary structure before dicing.

Figure 15:
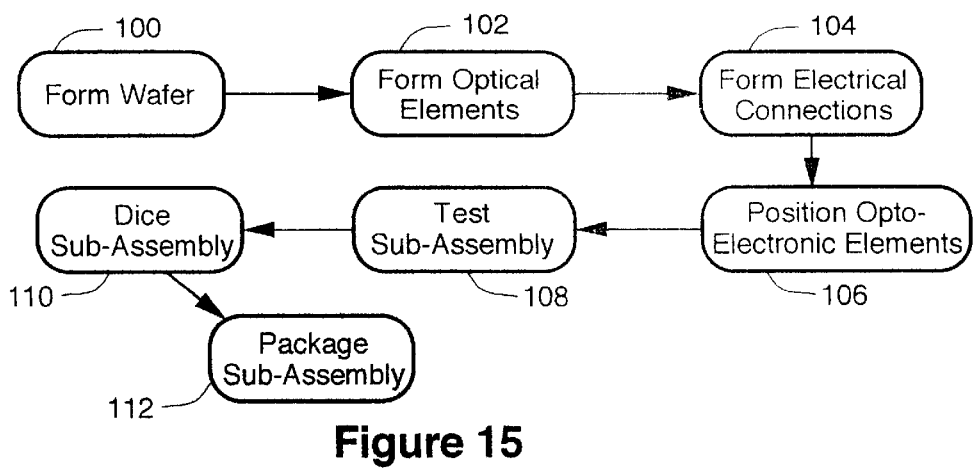
FIG. 15 is a block diagram of the steps associated with the construction of the opto-mechanical assemblies as illustrated in FIGS. 1, 5 through 9 and 13.

Optoelectronic transducer 26 is attached mechanically and electrically to optical wafer 12 by either a conductive epoxy or solder bump bond or by other means as illustrated as step 106 in FIG. 15. FIGS. 10a through 10c illustrate the use of any of these means. For a solder bump bond, this process may be accomplished by a "pick and place machine" which would provide an alignment tolerance of, for example, 3–25 $\mu$m while a self aligned solder bump process may provide a tolerance of 2 $\mu$m or even less. This same process may be used for affixing an optional monitoring photodiode 40, however its alignment usually does not need to be as accurate as optoelectronic transducer 26. A major improvement over prior art devices is the ability to utilize individual transducers 26 and photodiodes 40 as illustrated in FIG. 14. In prior art devices, these transducers were utilized on a wafer scale and there was no ability to use an individual transducer on a transducer wafer without manipulating the entire transducer wafer. Additionally since one lateral dimension of transducer 26 is smaller than one lateral dimension of wafer 12 (in this case, the lateral dimension between dicing lines on wafer 12), this assures that one is not utilizing well known wafer to wafer processes. Another advantage of the present invention is that the transducers may be pre-sorted before being mounted onto optical wafer 12. Also the wafer used to fabricate transducers 26 is efficiently utilized since the transducer wafer (not shown) does not need to include area-using elements such as circuitry. The present invention places non-transducer functionality such as circuitry on the less costly optical wafer 12.

As may be seen in FIG. 1, an electrical spacer 58 may be provided so as to allow contacts 39; for example, lead frame contacts, ceramic chip contacts, flex circuit contacts, or any other electrical contacts; to be in planar level across assembly 10.

As shown in FIG. 14, an automated probe test may be utilized to test the sub-packages at this point. It should be appreciated that the testing is preferably conducted at the wafer level, ie., before optical wafers 12, 14 are diced into individual components and housed. Finally, it should be appreciated that the step of testing the sub-assemblies at the wafer level is optional but would provide significant efficiency, cost reductions, and increased assembly process control.

Finally, the sub-assemblies are separated to form independent units that are then incorporated into a housing 52. This step is illustrated in FIG. 15 as block 110. Separation of sub-assemblies is performed preferably by sawing or any other method know in the semiconductor separation art.

Turning now to step 112, the independent units are packaged into housing or encapsulant 52. It should be appreciated that encapsulant 52 may be constructed of any material and is designed to provide structural integrity to the elements enclosed therein. It is preferred that optical wafer 14 have an alignment recess 59 so that waveguide 32 may be passively aligned to optical wafer 14.

Now that the basic structure of the Electro-Opto-Mechanical Assembly 10 has been described, it is essential to discuss some of the more critical features of the invention such as the physical positional relationships of optoelectronic transducer 26, waveguide 32 and optical elements 24. It is necessary to discuss the following relationships in detail: the distance "d" between optical elements 24 and waveguide 32; the distance between transducer 26 and optical elements 24, the lateral displacements between the optical axis 28 of waveguide 32 and optical axis 28' of transducer 26; the angular displacement between the optical axis 28 of waveguide 32 and optical axis 28' of transducer 26; the length of waveguide 32; and the size of optical elements 24 in relationship to transducer 26.

Figure 4:
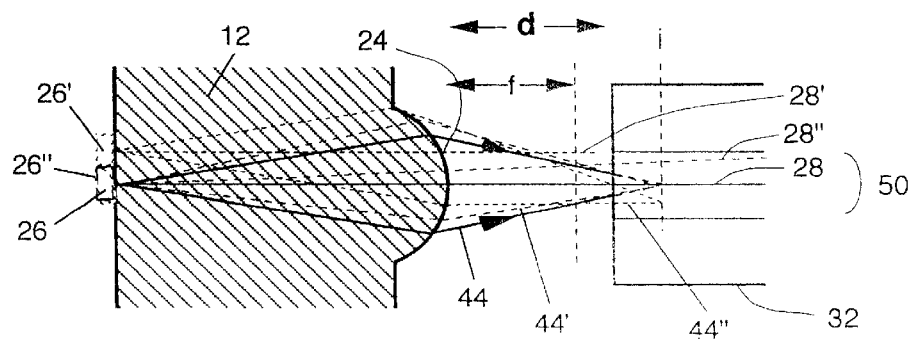
FIG. 4 is a cross sectional view of an optical system used for coupling a multimode waveguide.

Turning now to FIG. 4, we will now discuss the positioning of waveguide 32. Instead of using conventional object-image position for optoelectronic transducer 26 and waveguide 32, respectively, a MMF is positioned relative to the image position i and the back focal plane f. The optimal MMF distance "d" is defined by the type and radius optical element 24, the angle of the beam emitting from or incident upon optoelectronic transducer 26 and other factors such as back reflection from waveguide 32, width or diameter of fiber core 50, and sensitivity to lateral displacement of optical axis 28 and optical axis 28'. This position may be found experimentally or by simulation. Once the optimum position is determined, the present invention allows for passive alignment to achieve this same goal and thus eliminate the need for active alignment which is generally required in the prior art devices.

For clarity, like elements have been provided with like reference numerals except that a prime has been added to each reference numeral where there is a slight difference in the particular element in this embodiment.

FIG. 4 shows the light beam paths for 3 cases: perfect alignment of axis 28 is illustrated by beam path 44; lateral displacement of optoelectronic transducer 26' is illustrated by beam path 44' and axis 28'; and tilt of optoelectronic transducer 26" is illustrated by beam path 28" and axis 28". Due to the short focal length of optical element 24 and the relatively large fiber core diameter 50 of waveguide 32, tilts on the order of degrees have negligible effect in the MMF embodiment. It has been found that for MMF applications the maximum tilt of optoelectronic transducer 26" may be as high as 10 degrees without adverse impact on assembly 10 and 5 degrees for the SMF embodiment. Additionally, the maximum lateral displacement for MMF applications has been found to be >50 µm for the MMF embodiment and 2 µm for the SMF embodiment. The negligible effect of lateral displacement may be visualized in FIG. 4 by the near coincidence of beams 44 and 44", especially in the region near the back focal plane f.

A model based on the beam wave front propagation using commercial software (GLAD 4.5) has been developed to simulate and analyze the proposed optical design for a multimode fiber having a parabolic graded index core of 62.5 µm and 50 µm in diameter. The fiber model was analyzed to find the propagation length necessary for accurate coupling efficiency estimation. It was found that the major power loss (more than 95% of total losses) happens over very short length of waveguide 32, e.g., 2 to 5 mm (2–5 pitches). The propagation length 2.5 mm was chosen for waveguide 32 to determine coupling efficiency.

A typical value of optical plastic/glass refractive index of 1.5 was chosen for the initial simulation with a 62.5 µm core fiber. The size of optical element 24 and distances from transducer 26 to optical element 24, and from optical element 24 to waveguide 32 were approximated and varied in the simulation to achieve best system performance.

In FIG. 4, transducer 26' has been provided with a lateral offset and has optical beam path 44' associated with this offset. As may be seen, beam paths are in approximate alignment, especially near the back focal plane f, due to optical element 24. By utilizing optical element 24, transducer 26' may have a lateral offset of as much as 50 µm before optical coupling with waveguide 32 is significantly affected in the MMF embodiment. This is shown in FIGS. 11 and 12. This is accomplished by optical element 24 refocusing beam path 44' onto the core of waveguide 32 as illustrated in FIG. 4. It is preferable that optical element 24 have a radius of curvature of 300 µm or less in order to assure that the diameter and position of beam 44' at waveguide 32 will be appropriate for effective optical coupling with such a large lateral offset. For larger diameter fibers, e.g., plastic optical fibers, the maximum lateral offset is larger in approximate proportion to the ratio of the fiber diameters.

Turning now to FIGS. 11 and 12, the coupling efficiency for several lenses having radii which vary from 150 µm to 200 µm and having various conic constants are displayed. FIG. 11 corresponds to the molded lens embodiment illustrated in FIG. 13 while FIG. 12 corresponds to the wafer lens structure illustrated in FIG. 8. As may be seen, from the figures, a radius of 175 µm provides better coupling than 150 µm or 200 µm radii, and a 150 µm radius provides better coupling than 200 µm. Thus, the optimal radius of curvature is between 150 µm and 175 µm. Similarly, the optimal conic constant is between 0 and −1. It is clear from these figures that the coupling efficiency change is less than 10% for a 40 µm lateral offset of transducer 26 for an optical element 24 optimized for these conditions. Optical element 24 may be further optimized by forming its surface modified by even higher-order aspheric coefficients.

The designs are also very tolerant to optical element 24 radius and optical element 24 shape variation. For example, a 10% variation in the radius of optical element 24 and a significant change in optical element 24 shape (conic constant from −1 to 0) leads to little variation in coupling efficiency.

Turning now to FIGS. 10*a* through 10*c*, the bonding of transducer 26 to optical wafer 12 is illustrated. The process of mounting and bonding a transducer 26 with its active side down onto a patterned surface, such as optical wafer 12, is referred to as flip-chip bonding. Most lasers, including VCSELs, are not flip-chip bonded. Rather, the substrate side is bonded to a flush surface such as that of a TO-header. FIGS. 3 and 10*a* through 10*c* illustrate a close-up view of a flip-chip bonded VCSEL. If a self-aligned solder-bump bonding is used, transducer 26 typically stands about 50 µm off the surface of optical wafer 12 due to the large thickness of the solder bumps. Self-aligned solder-bump bonding has a distinct advantage over other bonding methods and is the preferred method in this invention. Due to surface tension in the solder in its liquid state, transducer 26 will actually be pulled into alignment with the photolihgraphically defined solder bump pads. For typical pad dimensions of about 50 µm, this means that as long as the transducer 26 chip is placed within about 25 µm of its desired position, the self alignment of the solder bonding process will pull the transducer 26 to within about 2 µm of the desired position. Use of smaller size pads require more accurate initial placement, produce more accurate alingment, and have reduced standoff height, in approximate proportion to the pad size. This passive self alignment is a tremendous benefit to the overall alignment budget and greatly reduces the lateral displacement discussed above.

The selection of the appropriate solder is not an inconsequential issue as well. When boding many chips to a common substrate, it is important that the chips do not fall off or move significantly while subsequent chips are being mounted. This will affect the choice of bonding materials. For example, a pure-indium solder is soft enough to "tack" with very light pressure and therefore a chip may be placed on wafer 12 with low likelihood of slippage. Thus, the characteristics for a suitable solder is one that will allow "tacking" to occur with little pressure and may be flowed at a temperature that will not affect wafer 12. In assembly 10, transducers 26, transducers 26' and photodiodes 40 would be mounted first, using an indium or other appropriate solder to take advantage of the passive self-aligning process. Then, a single heating of the entire optical wafer 12 might be used to align and bond all the traducers 26, transducers 26', and photodiodes 40. Then other chips could be mounted, for example with a conductive epoxy, which uses a lower temperature for setting. A more advanced process could incorporate a laser micro-welder to bond each chip as it is placed.

The one drawback to the self-aligned solder bonding process is the displacement between the surface of transducer 26 and optical wafer 12. This displacement raises the issues of a contaminant inside the beam of transducer 26, reflection feedback into transducer 26 as illustrated in FIG. 10*a* by optical rays 62. FIGS. 3, 10*b*, and 10*c* illustrate some options that may be used to reduce feedback effects to transducer 26. A promising solution to the contaminant and reflection problem is to fill the space, after bonding, with a material 60 whose refractive index matches that of wafer 12 as illustrated in FIG. 3. Materials are available for this purpose, such as a two-part optical silicone sold by Shin-Etsu. Another solution to this problem is to provide an antireflective coating 64 on optical wafer 12 as illustrated in FIG. 10*b*. In addition, or by itself, the surface of optical wafer 12 may be provided with a micro-rough surface 66 at least below transducer 26. This surface 66 is provided to scatter reflection and thus prevent coherent feedback into transducer 26. Yet another solution to this problem is to construct a raised dielectric mesa 68 and or a raised portion 70 of wafer 12. The mesa 68 and/or raised portion 70 effectively reduces the gap between transducer 26 and wafer 12. In this manner, the possibility of contamination and the detrimental effects of reflection feedback are reduced or eliminated. Finally, it should be appreciated that any of these options, in combination or alone, may be incorporated into any embodiment of the invention discussed above or below.

Now that the preferred embodiment has been discussed, alternate embodiments shall be described below. For clarity, like elements have been provided with like reference numerals except that a prime has been added to each reference numeral where there is a slight difference in the particular element in this embodiment. The following discussion will focus on the differences between the elements of this embodiment and that of the preferred embodiment.

Figure 8:
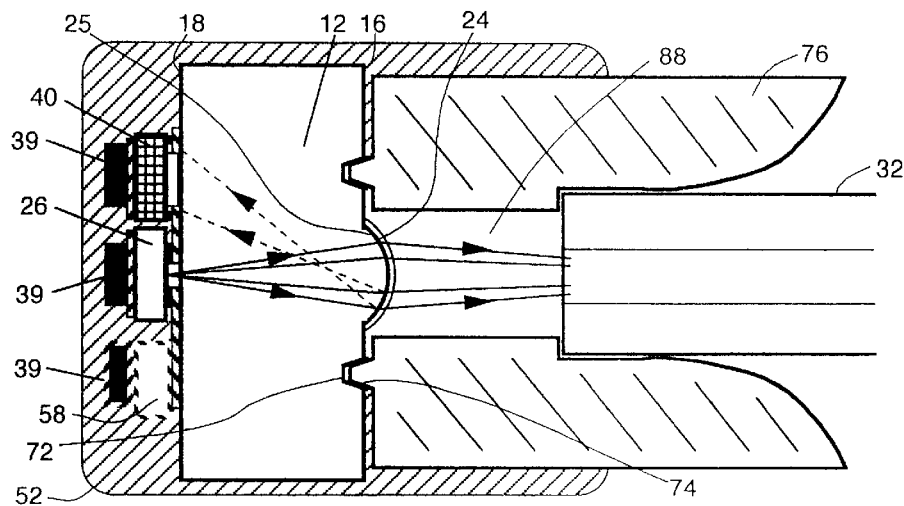
FIG. 8 is a cross-sectional view of an alternative embodiment of the opto-mechanical assembly of FIG. 1, which illustrates a hybrid assembly used to couple an optical waveguide to a light source.
Figure 16:
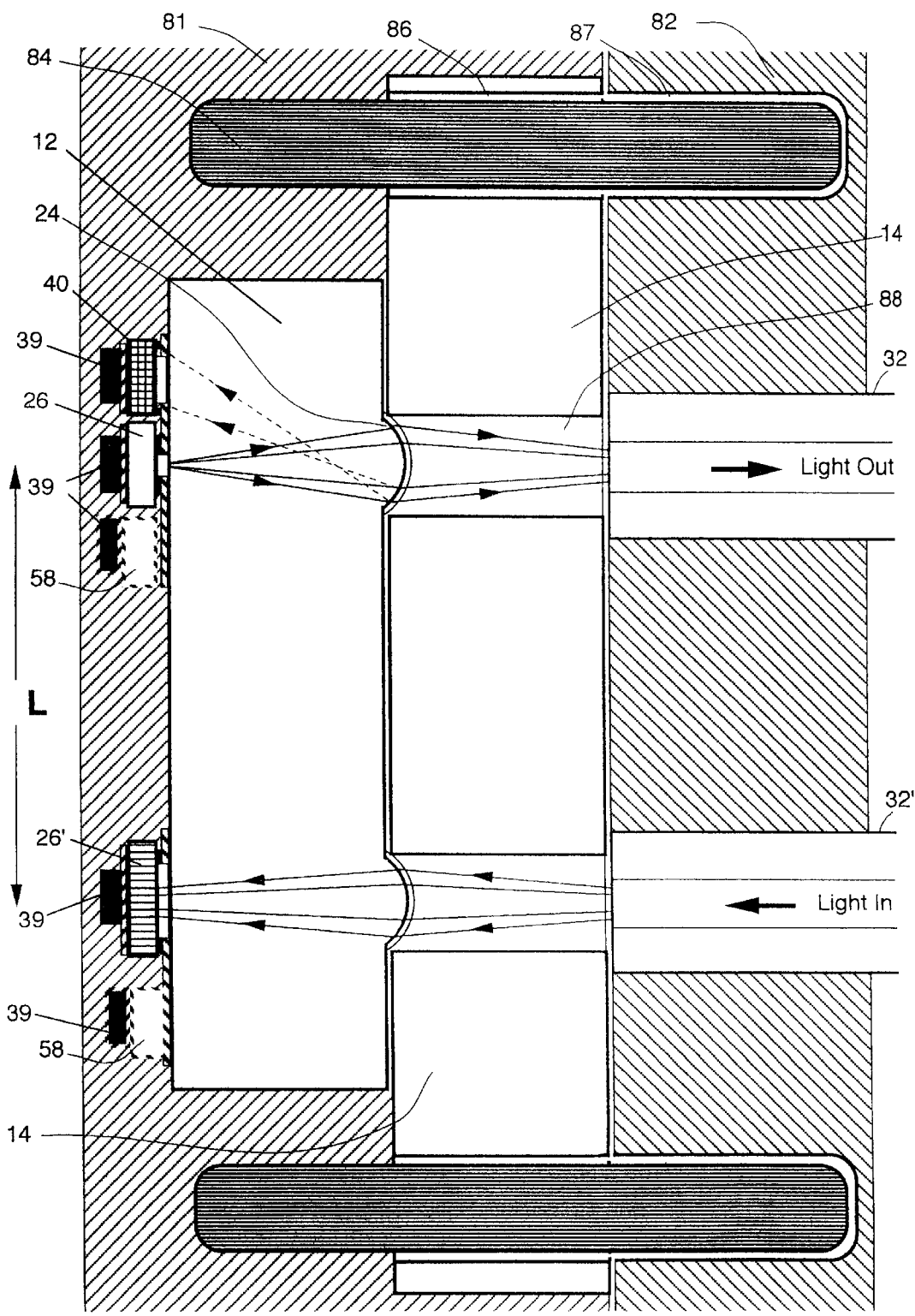
FIG. 16 is a cross-sectional view of a transceiver assembly constructed in accordance with an alternate embodiment of the invention.

Turning now to FIGS. 8, 9, 13 and 16, alternate embodiments of electro-opto-mechanical assembly 10 are illustrated. Specifically, FIG. 8 illustrates a hybrid assembly used to couple optical waveguide 32 to optoelectronic transducer 26. In this embodiment, a passive alignment feature 72 is provided for wafer 12 which mates with a passive alignment feature 74. In this embodiment, only one wafer 12 is used. Additionally, waveguide 32 is secured via a receptacle 76 having passive alignment features 74 disposed at one end. Receptacle 76 may be affixed to housing 52 by any means known in the art such as mechanical clips. Preferably, Receptacle 76 or connector 82 would be a MT-RJ fiber ferrule 82 fitting to alignment pins 84 as illustrated in FIG. 16. Receptacle 76 and connector 82 may be constructed of any material but would preferably be made from molded plastic.

Figure 9:
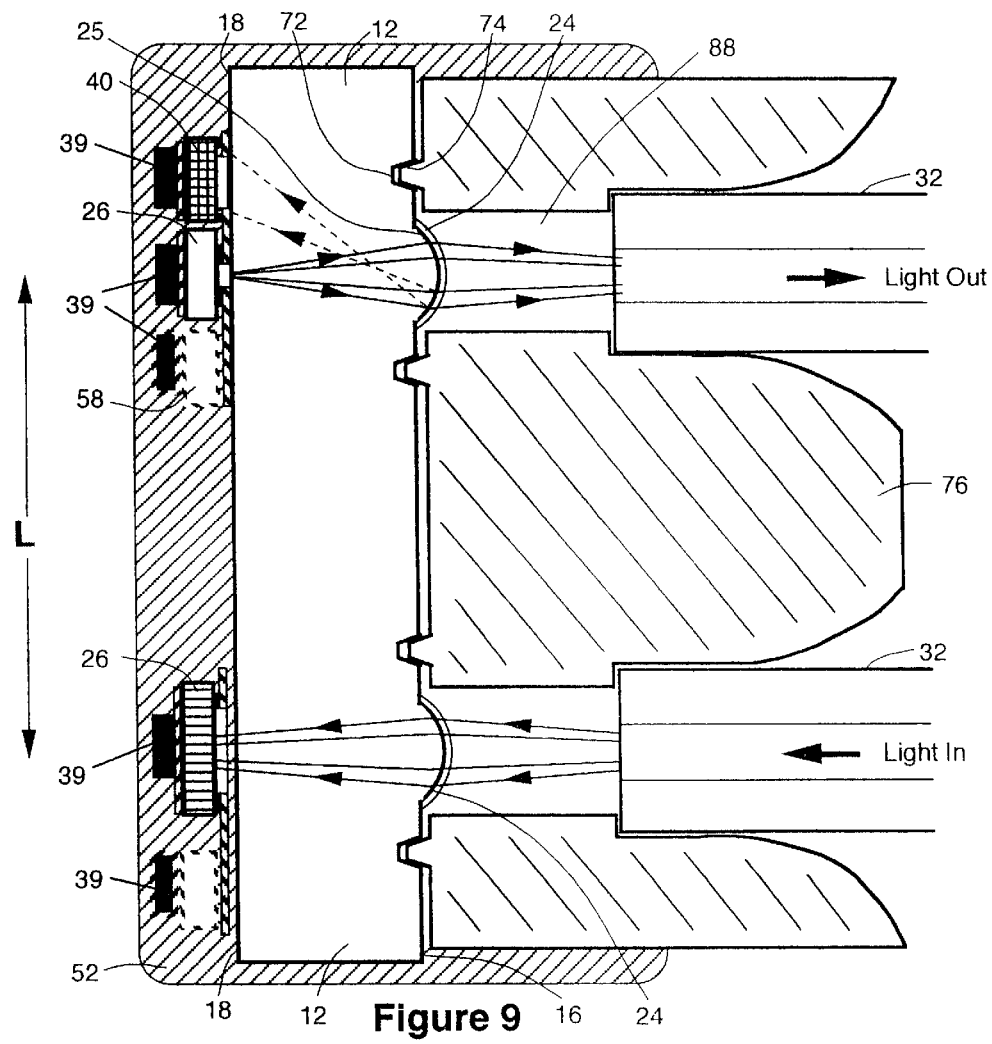
FIG. 9 is a cross-sectional view of a transceiver assembly constructed in accordance with a preferred embodiment of the invention.

Turning now to FIG. 9, a cross-sectional view of a duplex assembly is provided. As may be seen, this figure duplicates FIG. 8 and adds a second channel which may preferably be used as a receiver or as a second transmitter. Alternatively, both channels may be used as receivers. The invention readily extends to, and includes, any number of channels, such as 12 channels or even more.

Figure 13:
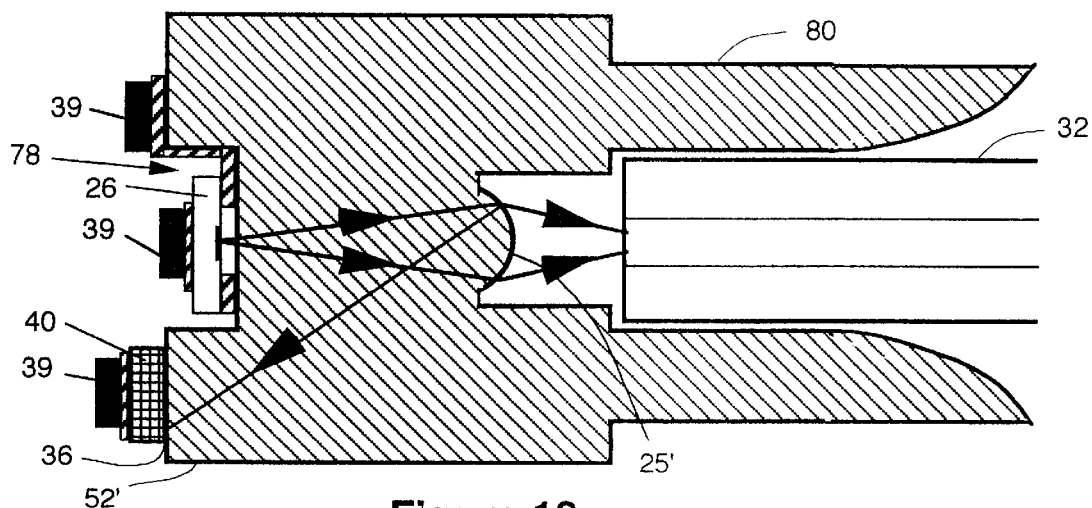
FIG. 13 is a cross-sectional view of an alternative embodiment of the opto-mechanical assembly of FIG. 1, which illustrates an integrated lens and housing assembly which is used to couple an optical waveguide to a light source.

Turning now to FIG. 13, a cross-sectional view of an integrated lens and housing assembly is illustrated. In this embodiment, housing 52' is formed from molded plastic or any other malleable material which transmits light. As may be seen housing 52' has an integrated lens 25'. In addition, recess 78 is formed in housing 52' to allow for mounting of transducer 26. Finally, housing 52' is provided with outwardly tapered flanges 80 that engage waveguide 32. It should be appreciated that flanges 80 need not be taped to be utilized in conjunction to the teachings of the present invention.

Turning now to FIG. 16, a transceiver assembly constructed in accordance with an alternate embodiment of the invention. This device is similar to that described in FIG. 9 in basic operation. This device has a different mounting structure for waveguides 32. Optical sub-assembly 81 comprises a solid piece with pins 84 precisely held in bores 86, wafers 12 and 14, transducers 26, contacts 39, etc. Fiber ferrule or connector 82 is another solid piece containing fibers 32 and 32' and counterbores 87 for precisely engaging pins 84. Wafer 14 could be just about any material including silicon, glass, or even a piece of metal, e.g. copper, with bores 86 and vias or voids 88 stamped through it or a lead-frame metal with etched features.

Figure 17:
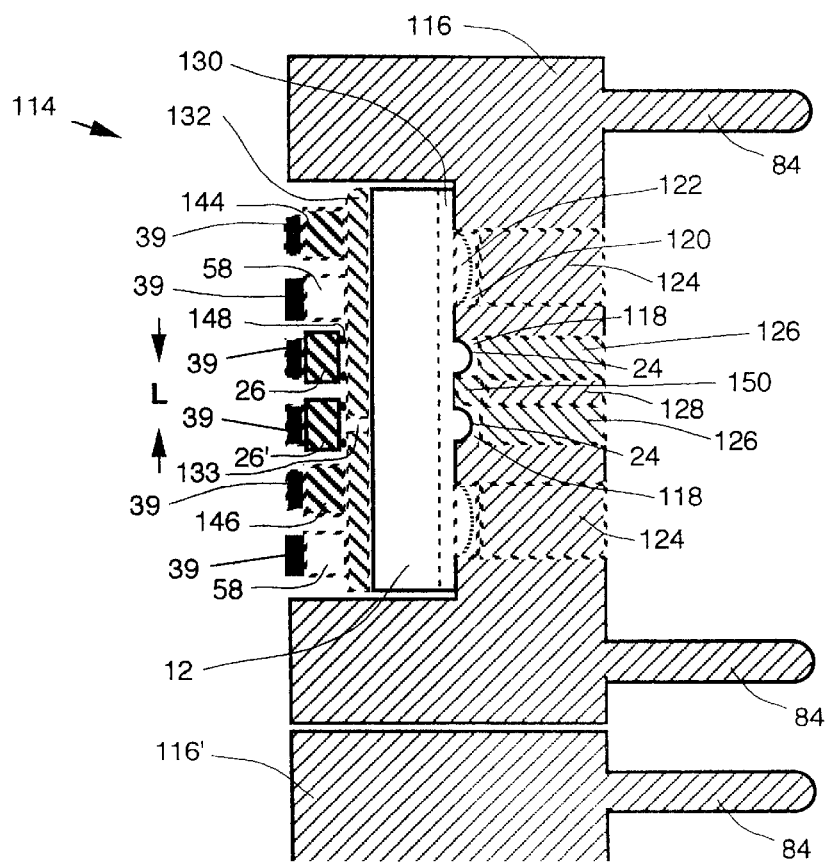
FIG. 17 is a cross-sectional view of an OSA or transceiver assembly constructed in accordance with an alternate embodiment of the invention.

Turning now to FIG. 17, an optical sub-assembly (OSA) or a transceiver 114 is illustrated. It comprises optoelectronic transducers 26, 26' and contacts 39 and may contain spacers 58. OSA or transceiver 114 also comprises connector 116 which is preferably a single piece of molded plastic which contains alignment pins 84, and includes spaces 118 which typically comprise air. It may also contain alignment receptacles 120, for precise alignment to alignment features 122. In the event that alignment receptacles 120 and alignment features 122 are not used, spaces 118 may be used for alignment to lenses 24. Spaces 118 and/or alignment receptacles 120 may be complete vias completely traversing connector 116, or they may be small air spaces, with plastic which fills regions 124 and 126, respectively. In the event that alignment receptacles 120 and alignment features 122 are used, and air spaces 88 are desired to be complete vias or voids 88, it is not necessary for region 128 to be filled with plastic, i.e., a single via or void 88 could be formed in which regions 126 and 128 comprise air. The preferred embodiment however has alignment receptacles 120 and alignment features 122, and regions 124, 126 and 128 are plastic filled as illustrated. Alignment features 122 may be formed in the same formation process as lenses 24, and may be larger than lenses 24 to increase mechanical robustness.

An additional and optional feature or wafer 12 is that it may contain one or more layers on either side which may comprise materials different from that of wafer 12. Lens layer 130 may be used if the material of wafer 12 is not well-suited for forming microlenses 24. For example, sapphire may be desired to comprise wafer 12, however it is very difficult to etch and therefore it may be difficult to form lenses 24 integral to it. In this case, several options exist. Lenses 24 may simply comprise a photoresist or other material which is allowed to melt, thereby forming lenses 24. One disadvantage of this structure is that the materials which may be melted so are typically not thermally, mechanically, or chemically robust. Suitable choices of materials and/or higher temperature melting may help this situation. Another choice is to form a layer 130 of tough material such as spin-on-glass (SOG), and then form microlenses 24 by the usual process of melting material such as photoresist followed by etching the resulting pattern into layer 130. Additionally, a circuit layer 132 is illustrated.

Circuit layer 132 may be used to increase functionality in wafer 12. In a preferred embodiment, circuit layer 132 comprises deposited silicon in a polycrystalline or crystalline state. In some embodiments, a region of circuit layer 132 absorbs a portion of light beam emitted from transmitting optoelectronic transducer 26. With suitable contacts, these regions may form a monitor for transducer 26, which replaces the functionality of monitor 40 illustrated in FIG. 16 and other Figures. This monitor has the advantage of sampling the entire beam, rather than just a portion. It may be desirable to remove a portion of circuit layer 132, leaving void 133, in order to maximize the efficiency of receiving optoelectronic transducer 26'.

OSA or transceiver 114 may comprise additional components to increase functionality. For example, driver circuit 144 may drive transmitting optoelectronic transducer 26, and/or amplifier 146 may amplify the signals from receiving optoelectronic transducer 26'. With sufficient transmit and receive functionality, OSA 114 comprises a transceiver. Driver circuit 144 and/or amplifier 146 may be bonded to wafer 12 with bump bonds, such as bump bond 148 for transducer 26, or they may be wirebonded or they may be mechanically and electrically attached by other means. Alternatively, drive and receive functionality may be implemented in circuitry directly in circuit layer 132. In a preferred embodiment, wafer 12 is sapphire, circuit layer 132 is silicon-on-sapphire (SOS), and the functions of monitoring the output of transmitting optoelectronic transducer 26, driving transducer 26, and amplifying the output of receiving optoelectronic transducer 26', are all integrated into circuitry formed in circuit layer 132.

FIG. 17 shows adjacent connector 116' which may be formed integral to connector 116. A plurality of connectors 116 may be formed integral to each other and on which wafer (chips) 12 may be placed while still intact. This would simplify the assembly process. Connector 116 may also comprise light barrier 150 to minimize light reflected from lens 24 from reaching receiving optoelectronic transducer 26'.

Figure 18:
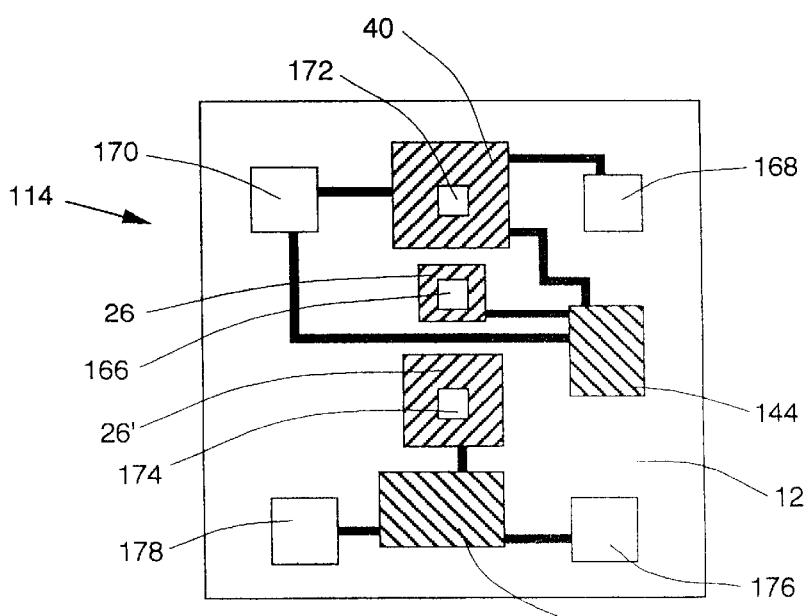
FIG. 18 is a planar view of the transceiver of FIGS. 9, 16, and 17.

Turning now to FIG. 18, an exemplary planar view of the electrical contacts for transceiver assembly 114 is illustrated. It should be appreciated that this view may also represent assemblies in FIGS. 9 and 16 as well. For simplicity, the arrangements of various components are described to correspond most closely with the arrangement of FIG. 17. As may be seen, optoelectronic transducer 26 is exemplified by a VCSEL having contact 166. A VCSEL driver chip 144 comprises, for example, a silicon CMOS circuit. Transmit power contact 168 and transmit ground contact 170 may optionally comprise spacers 58 shown in FIGS. 16 and 17. Monitoring photodiode 40 corresponds with photodetectors having a contact 172. Amplifier 146 may comprise a silicon CMOS circuit, or it may comprise, for example, a GaAs circuit and may be integrated with optoelectronic component 26' on the same chip. Receive power contact 176 and receive ground contact 178 may optionally also comprise spacers 58.

Now that we have discussed MMF embodiments, we shall now discuss other embodiments of the invention in a SMF context. As discussed above, tighter tolerances are required for the SMF embodiment and thus any teaching provided for the SMF embodiment may be incorporated into the MMF embodiment.

Turning now to FIG. 5, an alternate embodiment for the illustrates a refractive lens system used to couple single mode waveguide 32' to a transducer 26. In this embodiment, there is an optical element 24' that is disposed on surface 22 of optical wafer 14.

FIG. 6 illustrates a diffractive lens system used to couple a multi mode or single mode waveguide to a light source. The only substantive difference in this embodiment from that illustrated in FIG. 1 is that optical elements 24 and 24' are diffractive lenses 24 and 24'.

FIG. 7 illustrates an ion-diffused planar microlens system used to couple a single mode waveguide to a light source. In this embodiment, optical element 24 or optical element 24' is formed by diffusing ions 90 into wafer 12 or wafer 14 or both.

Figure 19:
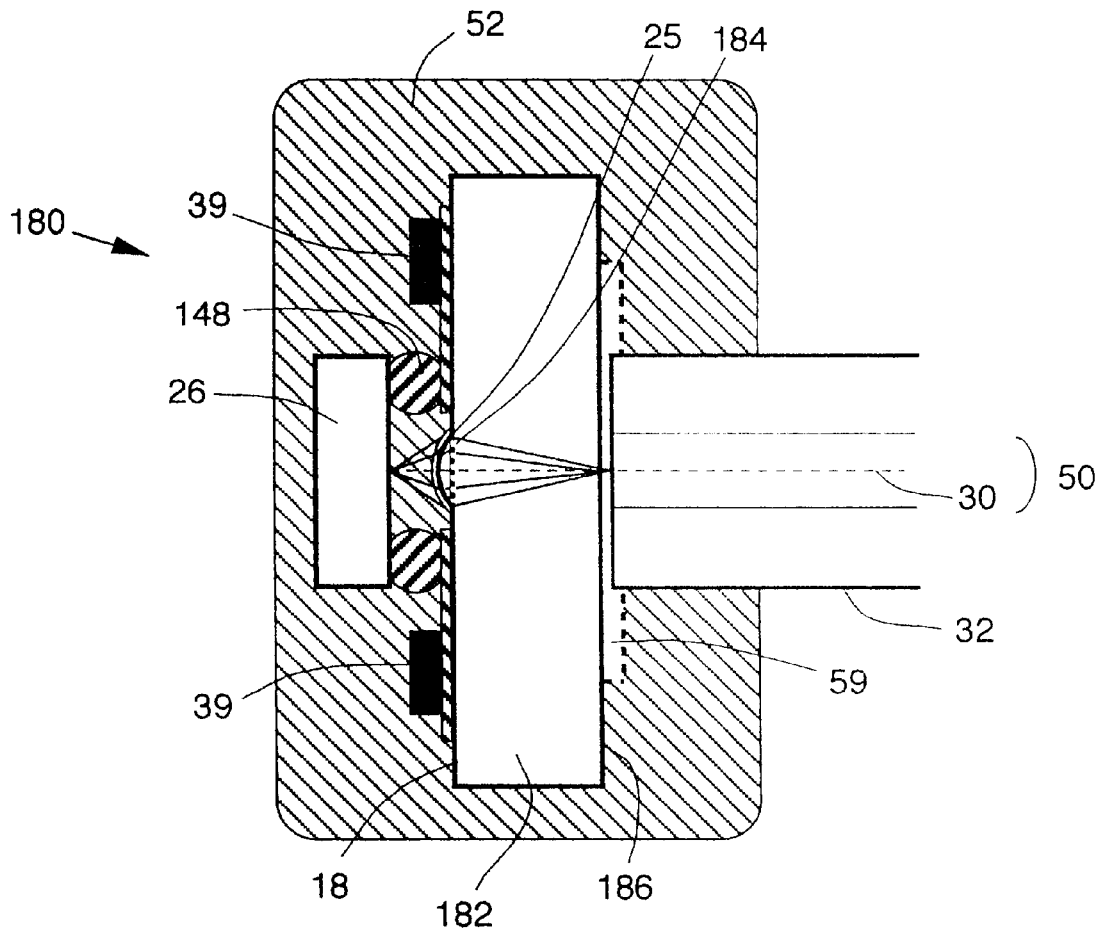
FIG. 19 is a cross sectional view of an opto-mechanical assembly constructed in accordance with yet another embodiment of the invention.

FIG. 19 shows yet another embodiment of the invention. Electro-opto-mechanical assembly 180 comprises wafer 182, on which optical element 184 resides on bottom surface 18, i.e., on the same side of wafer 182 as optoelectronic transducer 26. Due to this configuration, the distance between optoelectronic transducer 26 and optical element 184 is quite small, and determined by the standoff heights of bump bonds 148. This distance is typically 10's of micrometers compared to the typical distances of 100's of micrometers of embodiments described earlier. This means that optical element 184 may be quite small, typically less than 50 µm in diameter. Its fabrication is simpler and more accurate than that of optical elements of embodiments described earlier, and the optical aberrations are smaller. In most cases, the thickness of wafer 182 is on the order of 100 µm, significantly less than that of wafers 12 described earlier. Due to the reduced dimensions of electro-opto-mechanical assembly 180, any movements due to temperature or other changes are reduced approximately in proportion to the dimensions. The increased accuracy in electromechanical assembly 180 makes it a viable candidate for coupling to SMF over varying environmental conditions. The advantage of this embodiment over a simpler butt-coupled arrangement is that optical element 184 transforms the beam of a transmitting transducer 26 to make it better suited for coupling into the waveguide. For example, optoelectronic transducer 26 may comprise a VCSEL whose beam has an NA of 0.2, while the SMF has an accepting NA of about 0.1. In this case, appropriately configured optical element 184 would reduce the NA of the beam to about 0.1 at the waveguide end.

It is to be appreciated that there the invention described thus far is readily extendable to many alternative configurations. For example, the invention includes transmitting and/or receiving modules which comprise more than one transmitting and/or receiving element. In FIGS. 9, 16 and 17, optoelectronic transducers 26 and 26' could comprise a VCSEL and photodetector, respectively, as described, or they could both comprise VCSELs, or they could both comprise photodetectors. Furthermore, there could be more than 2 of such optoelectronic transducers in a single assembly. For example, one assembly may comprise an array of 1×12 transmitting elements, and another assembly may comprise an array of 1×12 receiving elements. A single assembly may comprise any number of transmitting and/or receiving elements.

While the various optoelectronic transducers are described as having their emitting (or receiving) surfaces facing the wafers on which they are mounted, it is also possible for emitters or receivers to have their emitting or receiving surfaces opposite the wafers on which they are mounted.

Additionally, it is possible for either type of element to be arranged in any form of array, for example 1-dimensional or 2-dimensional. FIG. 14 shows elements mounted to a microlens wafer in a 2-dimensional array. The dicing lines may be chosen to dice out single elements, rows of elements with any number of elements, or 2-dimensional arrays of elements with any number of elements. The spacing between adjacent elements in FIG. 14 may be uniform as shown, or elements could be clustered to optimize manufacturing efficiency for arrays.

While all of the above embodiments disclose the use of a waveguide 32, it should be appreciated that the teachings of this invention are not limited to the need for this waveguide. In other words, the invention has applications in pointers, bar code scanners, disk drives, CD-ROM drives as well as the communications assembly described above.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. An optical element comprising:

at least one lens having at least a first surface having a radius of curvature of 300 micrometers or less; and an alignment means for aligning said lens with an optical fiber, said alignment means being integral with said lens.

2. The optical element of claim 1, wherein said alignment means comprises a passive alignment feature.

3. The optical element of claim 1, wherein said optical element comprises at least two lenses.

4. The optical element of claim 1, wherein said optical element comprises a molded optical element.

* * * * *